No. 784,112. PATENTED MAR. 7, 1905.
J. W. LEDOUX.
FLUID METER.
APPLICATION FILED APR. 12, 1904.
3 SHEETS—SHEET 1.
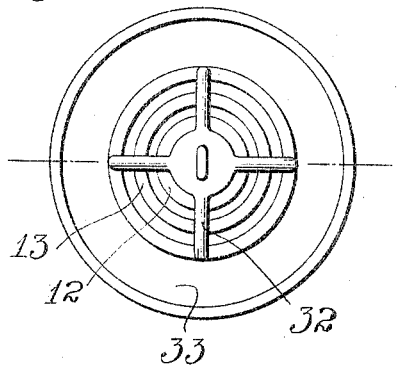
Fig. 2
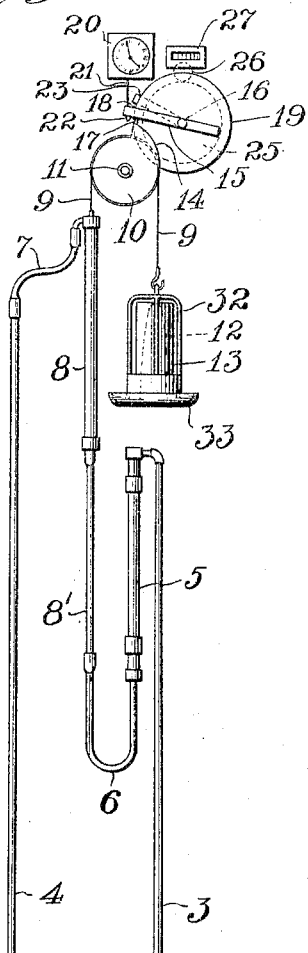
Fig. 1
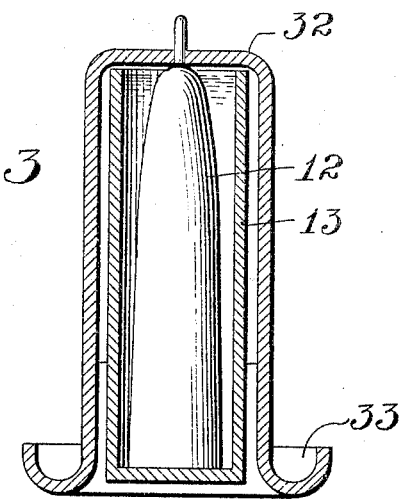
Fig. 3
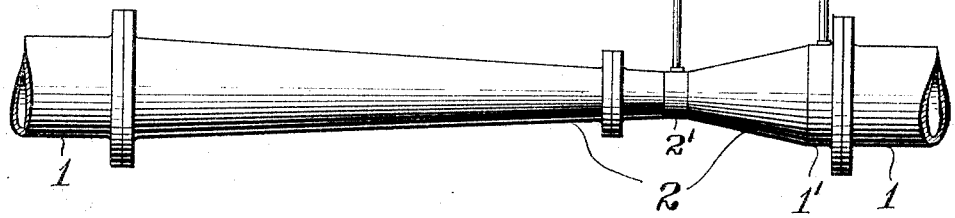
WITNESSES:
INVENTOR
John W. Ledoux
BY
Charles N. Butler
ATTORNEY.

No. 784,112. PATENTED MAR. 7, 1905.
J. W. LEDOUX.
FLUID METER.
APPLICATION FILED APR. 12, 1904.

3 SHEETS—SHEET 3.

WITNESSES:
INVENTOR
John W. Ledoux
BY
Charles N. Butler
ATTORNEY.

No. 784,112. Patented March 7, 1905.

UNITED STATES PATENT OFFICE.

JOHN W. LEDOUX, OF SWARTHMORE, PENNSYLVANIA.

FLUID-METER.

SPECIFICATION forming part of Letters Patent No. 784,112, dated March 7, 1905.

Application filed April 12, 1904. Serial No. 202,729.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

This invention is designed, primarily, for measuring the flow of liquids. Its leading object is to provide improved mechanism that will measure accurately the amount of liquid flowing at any rate from a state of rest to a maximum.

In the measurement of liquids flowing through conduits the meters heretofore used have afforded a fair degree of accuracy when the velocity of the current is substantial, but when the velocity has fallen below a certain limit the measurements are unreliable. In the present invention this limitation is corrected and a meter is provided that will measure correctly continuously.

Figure 4:
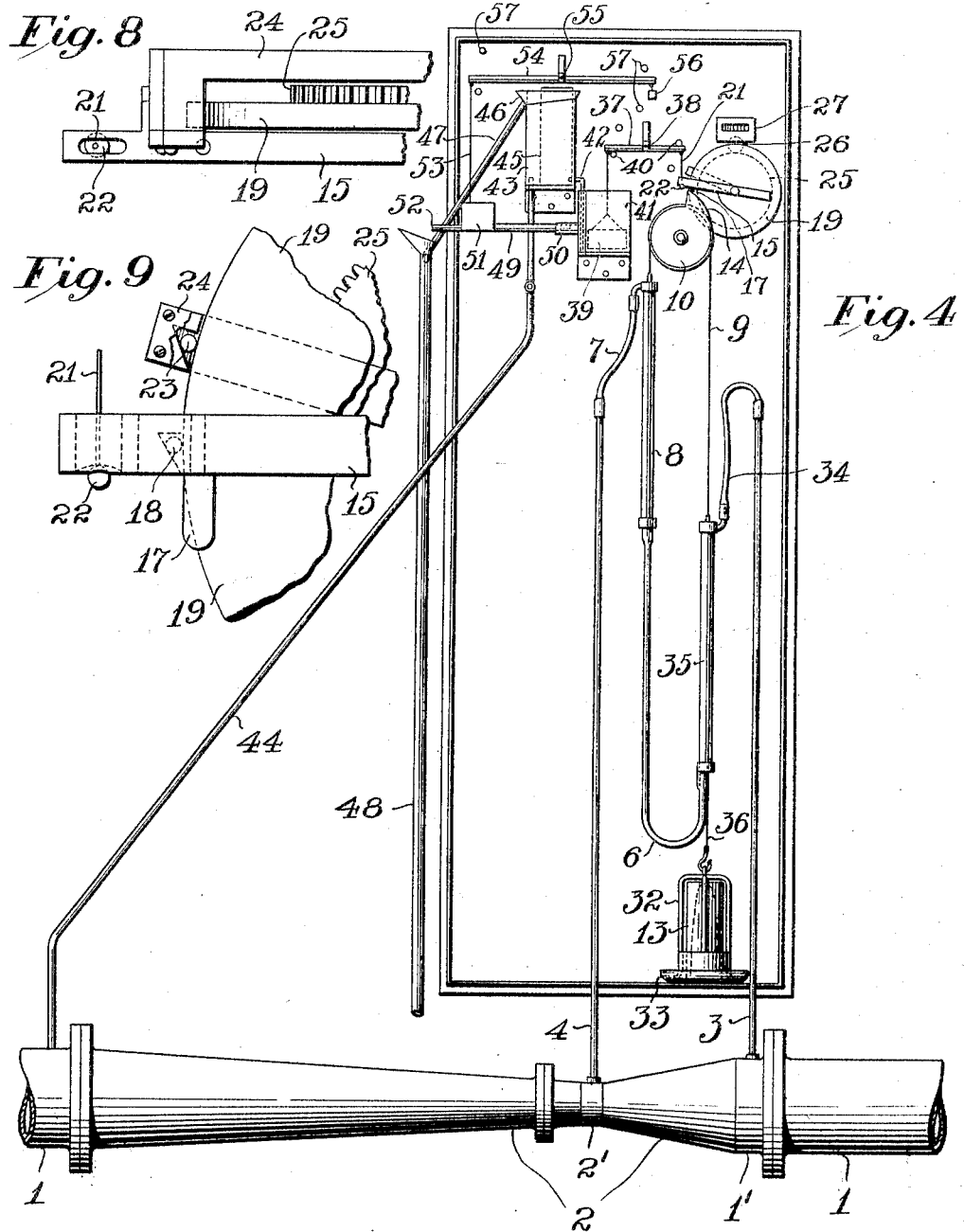
Figure 5:
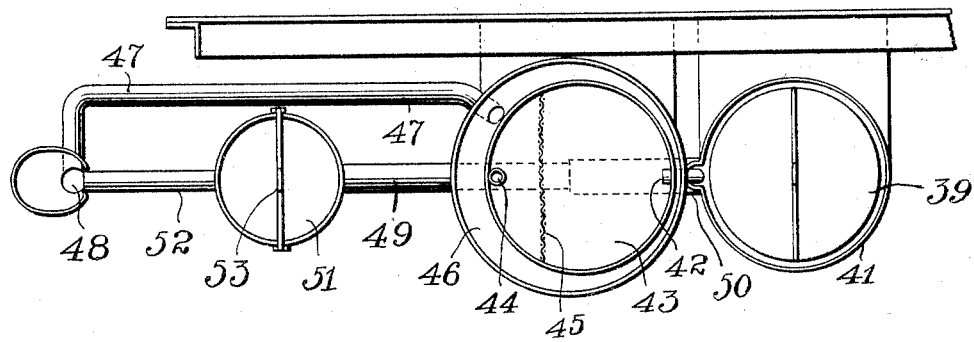
Figure 6:
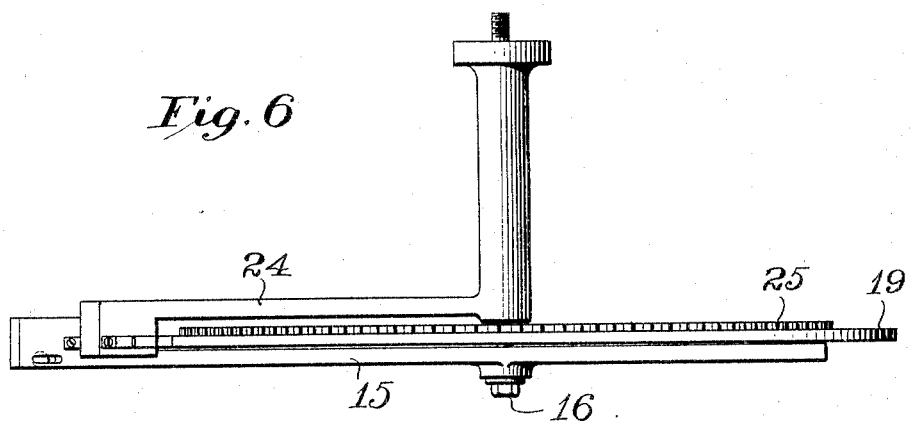
Figure 7:
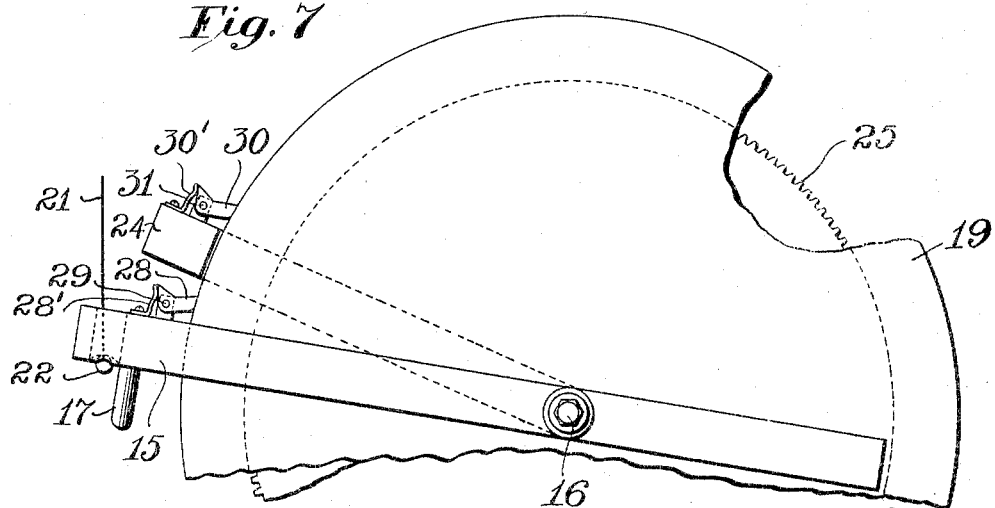

In the accompanying drawings, Figure 1 represents a side elevation of a meter embodying my improvements. Fig. 2 represents a top plan view, on an enlarged scale, of the float mechanism shown in Fig. 1. Fig. 3 represents a vertical sectional view of the float mechanism. Fig. 4 represents a side elevation of an additional form of my invention. Fig. 5 represents a top plan view of the water clock mechanism shown in Fig. 4. Fig. 6 represents a top plan view, and Fig. 7 represents a side elevation, of the register-actuating mechanism; and Fig. 8 represents a top plan view, and Fig. 9 represents a side elevation, in illustration of a modified detail for actuating the register.

As shown in the drawings, the fluid-conduit 1 is provided with the contracted section 2. A tube 3 rises from the conduit at the normal section 1', and a tube 4 rises from the contracted section 2'. As shown in Fig. 1, the tube 3 communicates with the upper end of a stationary tube 5, having its top closed and its bottom in communication with the flexible tube 6, the tubes 5 and 6 acting as reservoirs for mercury subject to fluid-pressure communicated from the section 1' through the tube 3.

The tube 4 has its top connected with the flexible tube 7, which communicates with the upper end of a movable tube 8, having its top closed and its lower contracted part 8' in communication with the tube 6, the tube 8 8' acting as a reservoir for mercury subject to fluid-pressure communicated from the section 2' through the tubes 4 and 7. The tube 8 is supported by a cord 9, which passes over a wheel 10, having an arbor 11, and connects with a float 12, movable in a mercury reservoir or float-chamber 13. Fixed to and revoluble with the arbor 11 is a cam 14, whose position is regulated by the movements of the tube 8 and float 12, rectilineally reciprocating with variations in pressure due to the differences between the pressures in the conduit at the sections 1' and 2' at different velocities. A lever 15, fulcrumed on the arbor 16, has the tappet 17, adapted to make contact with the cam and a rolling clutch 18, adapted to engage the disk 19, fixed on the arbor. The lever, which falls by gravity to a point varied by changes in the cam's position, is raised to a fixed point at regular intervals by a clock mechanism 20, which causes the cord 21 to reciprocate vertically through a constant space at regular intervals. The cord has a weight 22 suspended at its lower end to carry it downward through the lever and to engage and elevate the lever on the upward stroke. The disk 19, advanced at regular intervals through the arc of movement of the lever 15, is held against retraction through the engagement of its periphery by the rolling clutch 23, supported by the stationary arm 24. (See Figs. 8 and 9.)

The disk 19 has a spur-wheel 25 connected to and revolved thereby, the wheel 25 driving a pinion 26, which operates the register 27.

As shown in Figs. 6 and 7, the disk 19 and the spur-wheel 25 may be given their forward motion by means of a friction-clutch in the form of a gravity-pawl 28, having the pivotal connection 29 with the lever 15, the pawl sliding freely on the periphery of the disk as the lever descends until the tappet 17 makes contact with the cam 14 and gripping the disk's periphery on the upward movement of the lever. In like manner the stationary arm 24 may be provided with a gravity-pawl 30, having the pivotal connection 31 therewith and engaging the periphery of the disk, the pawl permitting the disk to advance freely and holding it against backward movement. The respective pawls may be pressed down by the springs 28' and 30'.

As shown in Figs. 1 to 4, inclusive, the float 12 is preferably a figure of revolution dependent upon the equation representing the resultants or differences between the pressures at the sections 1' and 2' due to variations in velocity from a static condition to the maximum. When the velocity is zero, the float reaches its maximum submergence, and as the velocity accelerates from zero the float is elevated. In order to adjust the weight to be elevated in elevating the float, the latter has fixed to its apex a spider 32, having the channel 33, adapted for holding shot or suitable weighting material. The cam 14 is a spiral whose length is proportional to the maximum of the float and its height proportional to the maximum stroke of the tappet. It follows that when the velocity is zero and the float is submerged to its maximum depth the highest point of the cam is brought under the tappet 17, the lever 15 is held thereby at the upper limit of its stroke, the disk 19 remains stationary, and the indicator is inactive. As the velocity increases from zero and the float rises the lower points of the cam are brought under the tapper of the lever, the stroke of the latter increases, and the rate of registration is accelerated, the register being operated at the rate required to show the amount of liquid that has passed through the conduit.

As shown in Fig. 4, while the contracted section 2' of the conduit 1 is connected by the tube 4 and the flexible tube 7 with the reciprocating tube 8 the normal section 1' is connected by the tube 3 and the flexible tube 34 with the top of a reciprocating tube 35. The tubes 8 and 35 have their lower ends connected by a flexible tube 6 and are supported on the wheel 10 by their connecting cord 9. The tube 35 is connected by the cord 36 with the float 12, acting in the reservoir 13 and carrying the spider 32. The cam 14, connected to the wheel 10, is brought to position by the movement of the tubes 8 and 35 until they are balanced by the float 12 and limits the downward movement of the lever 15, regulating its amplitude and the arc through which the disk 19 is moved at each impulse to actuate the register.

As shown in Figs. 4 and 5, the clock mechanism for actuating the registering mechanism employs a lever 37, having a fulcrum 38. One end of this lever carries the cord 21, which passes freely downward through the lever 15 and engages it on the upper stroke by its weight 22. The other end of the lever carries the float 39. The stops 40 limit the lever's movements. The float 39 is contained in a chamber 41, which is connected by a supply-pipe 42 with a reservoir 43. The reservoir is connected with the conduit 1 by the pipe 44, by which it is kept constantly filled and overflowing. The inlet to the reservoir by the pipe 44 and the outlet by the pipe 42 are separated by a screen 45, through which the water is filtered and cleansed of obstructing matter. The top of the reservoir is provided with a channel 46, which receives the overflow and discharges it by a pipe 47 to the pipe 48. The float-chamber 41 communicates with a duct 49, having a flexible joint 50, the duct communicating with a bucket 51, which discharges through the duct 52 into the pipe 48, the duct 52 being smaller than the duct 49 to retard discharging the bucket and maintain it filled until the float-chamber empties. The bucket has the connection 53 with one end of the lever 54, having a fulcrum 55 and a counterweight 56 to balance the bucket, the lever having its movement limited by the stops 57. It will be understood that as water flows from the reservoir 43 into the float-chamber 41 under a constant head at regular intervals the float-chamber will fill, the float 39 will be elevated, and the bucket 51 will fill, descend, and empty, discharging the float-chamber and lowering the float. The regular reciprocation of the float thus induced causes a regular oscillation of the lever 37, by which the lever 15 and the mechanism connecting it with the register 27 are actuated; but as the lever 15 oscillates in an arc whose amplitude is varied by the cam 14, the position of the latter being regulated by the positions of the balancing mechanism induced by the pressure conveyed through the tubes 3 and 4 to the mercury-reservoirs, the register will operate at the rate required to register the flow in the conduit 1.

Having described my invention, I claim—

1. In a meter, a fluid-conduit, a fluid-reservoir connected therewith reciprocated by variations in the resultant pressure communicated to the contents thereof from said conduit, and a float for balancing said reservoir, said float having a variable cross-section proportioned in accordance with the variations in said resultant pressure, substantially as specified.

2. In a meter, a fluid-conduit, a balanced reservoir containing mercury, tubes connecting a normal and contracted section of said conduit with said reservoir, and a float for balancing said reservoir, substantially as specified.

3. In a meter, a pair of stationary tubes, a reciprocating receptacle having a flexible fluid connection with each of said stationary tubes, means for supporting said receptacle, and a float connected to said reciprocating receptacle, substantially as specified.

4. In a meter, a pair of stationary tubes, a single reciprocating receptacle having a flexible fluid connection with each of said stationary tubes, an oscillating support for said reciprocating receptacle, and a float for balancing said reciprocating receptacle, substantially as specified.

5. In a meter, a movable cam, a register, a rotary disk connected with and operating said register, oscillating mechanism for frictionally clutching and actuating said disk, said cam regulating the arc of said oscillating mechanism, and a clock mechanism for actuating said oscillating mechanism, substantially as specified.

6. In a meter, a register, a rotary disk connected with and actuating said register, an oscillating lever having a gravity-clutch for frictionally engaging said disk in the forward movement, a clock for oscillating said lever, and a stationary support having a gravity-clutch for frictionally engaging said disk, substantially as specified.

7. In a meter, a fulcrumed lever, a float connected to one end of said lever, an engaging device, a support connecting said engaging device with the other end of said lever, and a second lever through which said support passes freely in one direction, said device engaging said support to said second lever in moving in the opposite direction, substantially as specified.

8. In a meter, a float-chamber, an oscillating receptacle, a flexible conduit connecting said oscillating receptacle with said float-chamber, and a balance connected with said oscillating receptacle, substantially as specified.

9. In a meter, a float-chamber, means for delivering fluid to said chamber at a regular rate, a flexible duct communicating with said float-chamber, a receptacle with which said duct communicates, a duct discharging from said receptacle, and a balance connected with said receptacle, substantially as specified.

10. In a meter, a reservoir having an overflow adapted for maintaining a constant head therein, a float-chamber having a fluid connection with said reservoir, and an oscillating receptacle having a fluid connection with said float-chamber, substantially as specified.

In testimony whereof I have hereunto set my hand, this 9th day of April, 1904, in the presence of the subscribing witnesses.

JOHN W. LEDOUX.

Witnesses:
 HOWARD M. LONG,
 UTLEY E. CRANE, Jr.